United States Patent [19]

Delamoreaux

[11] Patent Number: 5,210,937
[45] Date of Patent: May 18, 1993

[54] METHOD OF FORMING A TELEPHONE LINE OVERVOLTAGE PROTECTION DEVICE

[75] Inventor: Murray I. Delamoreaux, Hoffman Estates, Ill.

[73] Assignee: Oneac Corporation, Libertyville, Ill.

[21] Appl. No.: 851,070

[22] Filed: Mar. 13, 1992

[51] Int. Cl.$^5$ .............................................. H01R 9/09
[52] U.S. Cl. ........................................ 29/839; 29/843; 29/845; 439/83; 439/876; 361/413
[58] Field of Search ............... 29/843, 837, 838, 839, 29/845, 881, 884; 439/83, 876, 741; 361/413

[56] References Cited

U.S. PATENT DOCUMENTS

| | | | |
|---|---|---|---|
| 4,410,230 | 10/1983 | SanMiguel | 439/876 |
| 4,739,188 | 4/1988 | DeCandia et al. | 361/413 |
| 4,826,441 | 5/1989 | Palmer, III | 29/837 |
| 4,952,529 | 8/1990 | Grider | 29/884 |
| 4,971,581 | 11/1990 | Lace | 439/625 |

Primary Examiner—P. W. Echols
Assistant Examiner—David P. Bryant
Attorney, Agent, or Firm—Mason, Kolehmainen, Rathburn & Wyss

[57] ABSTRACT

A telephone line overvoltage protection device and a method of forming an overvoltage protection device are provided. A first terminal guard housing defines a plurality of terminal receiving channels. A second housing contains a printed wiring board and the first terminal guard housing is arranged for mating engagement with the second housing. A plurality of terminals are inserted in the terminal receiving channels. Each of the terminals includes an outwardly extending terminal portion extending outside the first terminal guard housing. The outwardly extending terminal portion of each of the terminals is formed to define a line of terminal portions corresponding to a plurality of terminal receiving apertures in the printed wiring board. Then the terminal portions are inserted in the terminal receiving apertures and soldered to the printed wiring board. The terminals are bent to position the printed wiring board and a mating portion of the first terminal guard housing for insertion into the second housing.

6 Claims, 2 Drawing Sheets

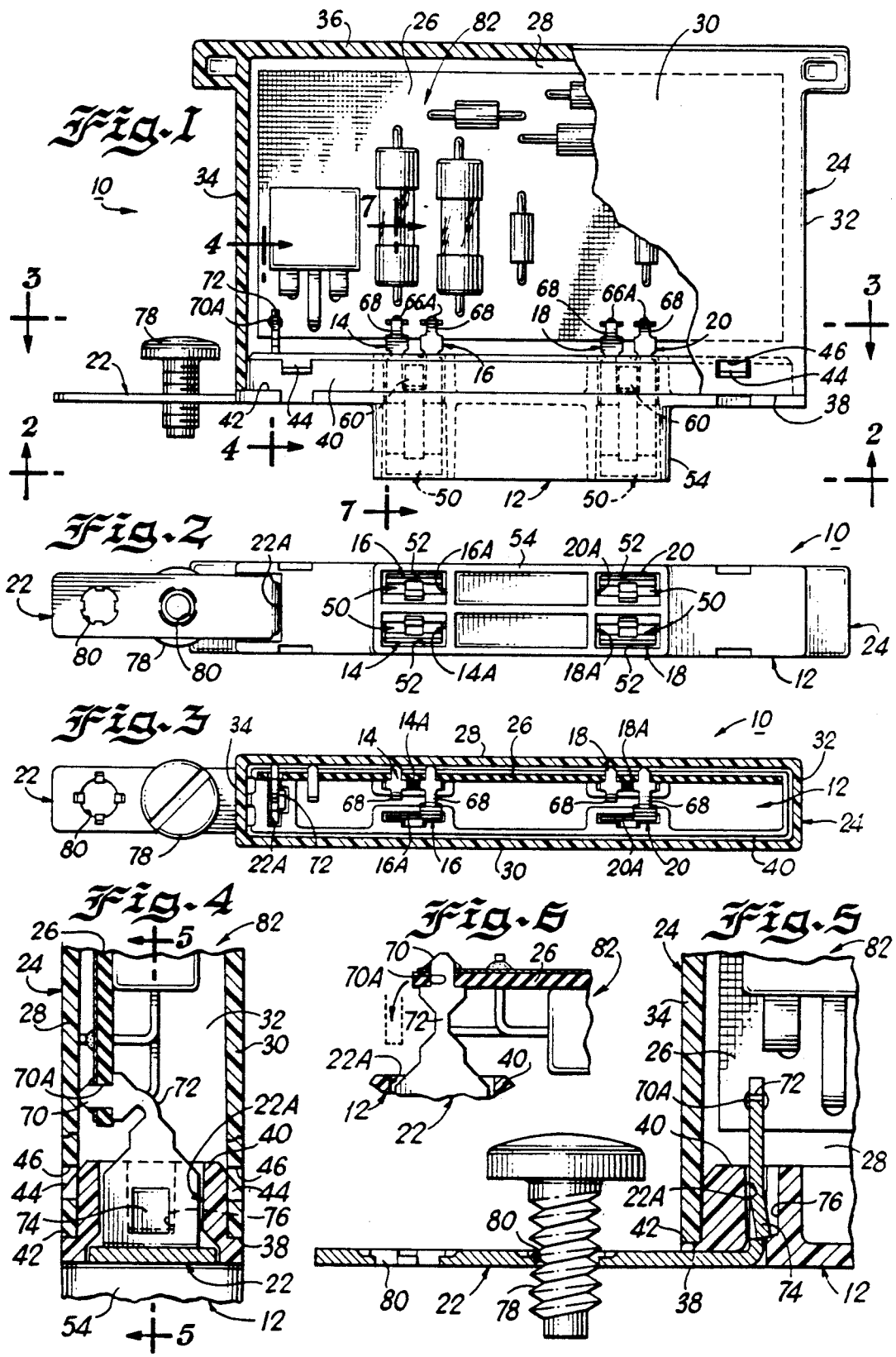

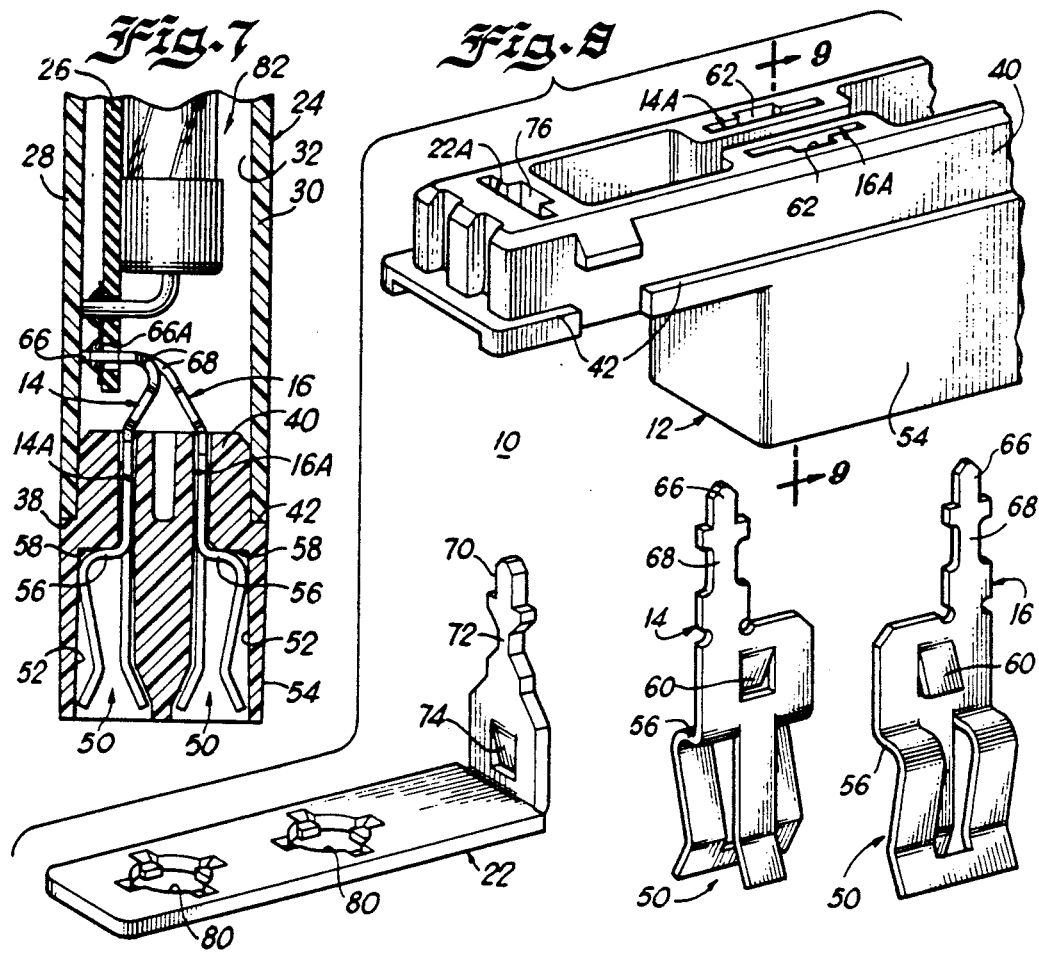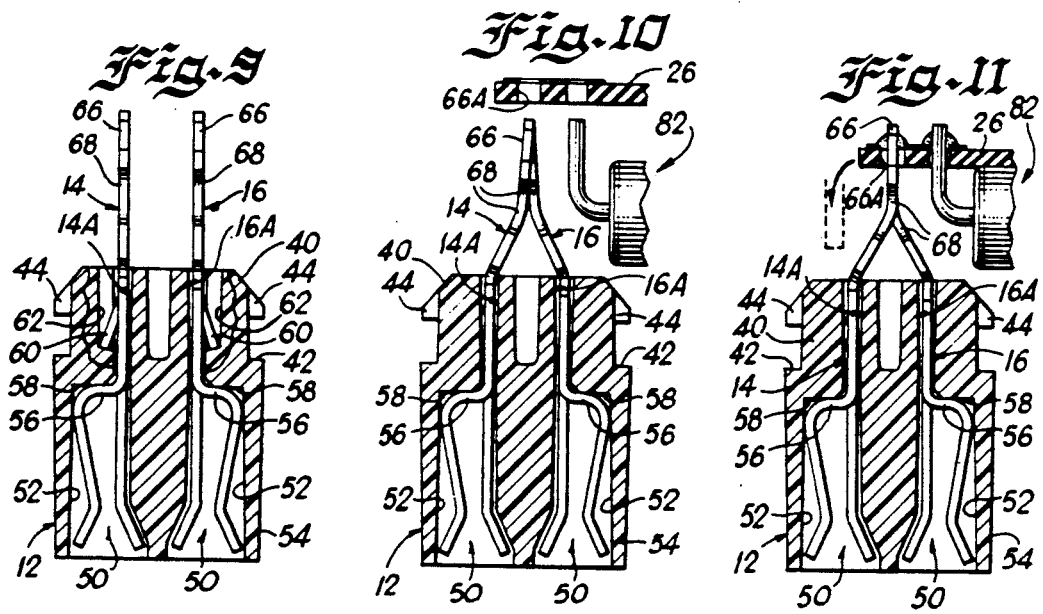

METHOD OF FORMING A TELEPHONE LINE OVERVOLTAGE PROTECTION DEVICE

BACKGROUND OF THE INVENTION

1. Field of the Invention

The present invention relates generally to telephone line overvoltage protection devices, and more particularly to an improved configuration and method of forming a telephone line overvoltage protection device.

2. Description of the Prior Art

Overvoltage protection devices are commonly used with telephone lines for protecting telephone equipment against hazardous voltages due to lightning or power surges. Overvoltage protection circuitry that overcomes many disadvantages of the prior art circuitry is disclosed in McCartney, U.S. Pat. No. 4,758,920, issued Jul. 19, 1988 and McCartney et al., U.S. Pat. No. 4,941,063, issued Jul. 10, 1990 and both assigned to the assignee of the present invention.

U.S. Pat. No. 4,971,581 issued Nov. 20, 1990 and assigned to the assignee of the present invention, discloses a connector guard for use with a telephone line overvoltage protection device of the type having a plurality of terminals for electrical and mechanical connection with a telephone connector block. The connector guard is an electrically insulative housing defining a plurality of terminal receiving channels providing electrical insulation between adjacent terminals and adjacent ones of the telephone line overvoltage protection devices. While the disclosed connector guard overcomes many disadvantages of known telephone connector block assemblies and provides improved reliability, it is desirable to provide a telephone line overvoltage protection device configured for facilitating manufacture, assembly and use.

Problems with known protection devices generally effective for overvoltage noise and transient protection include the complexity, the difficulty and time required for manufacture and assembly.

SUMMARY OF THE INVENTION

Among the principal objects of the present invention are to provide an improved telephone line overvoltage protection device; to provide a telephone line overvoltage protection device facilitating manufacture, assembly and improved reliability; and to provide a telephone line overvoltage protection device overcoming many of the disadvantages of known overvoltage protection devices.

In brief, the objects and advantages of the present invention are achieved by a telephone line overvoltage protection device and a method of forming an overvoltage protection device. A first terminal guard housing defines a plurality of terminal receiving channels. A second housing contains a printed wiring board and the first terminal guard housing is arranged for mating engagement with the second housing. A plurality of terminals are inserted in the terminal receiving channels. Each of the terminals includes an outwardly extending terminal portion extending outside the first terminal guard housing. The outwardly extending terminal portion of each of the terminals is formed to define a line of terminal portions corresponding to a plurality of terminal receiving apertures in the printed wiring board. Then the terminal portions are inserted in the terminal receiving apertures and soldered to the printed wiring board. The terminals are bent to position the printed wiring board and a mating portion of the first terminal guard housing for insertion into the second housing.

BRIEF DESCRIPTION OF THE DRAWING

The present invention together with the above and other objects and advantages may best be understood from the following detailed description of the embodiment of the invention illustrated in the drawing, wherein:

FIG. 1 is an elevational view partly broken away of a telephone line overvoltage protection device constructed in accordance with the present invention; and FIG. 2 is an elevational view of the telephone line overvoltage protection device viewed from the line 2—2 of FIG. 1;

FIG. 3 is a sectional view of the telephone line overvoltage protection device viewed from the line 3—3 of FIG. 1;

FIG. 4 is a sectional view of the telephone line overvoltage protection device viewed from the line 4—4 of FIG. 1;

FIG. 5 is a sectional view of the telephone line overvoltage protection device viewed from the line 5—5 of FIG. 4;

FIG. 6 is a fragmentary sectional view similar to FIG. 5 illustrating a grounding member after being inserted into the printed wiring board and soldered and before being aligned to its assembled condition;

FIG. 7 is a sectional view of the telephone line overvoltage protection device viewed from the line 7—7 of FIG. 1;

FIG. 8 is a fragmentary exploded perspective view of a portion of the telephone overvoltage protection device of FIG. 1 constructed in accordance with the present invention;

FIG. 9 is a sectional view of the telephone line overvoltage protection device viewed from the line 9—9 of FIG. 8 illustrating a pair of terminal clips first inserted into the base guard;

FIG. 10 is a similar view to FIG. 9 illustrating the pair of terminal clips after being aligned for insertion into a printed wiring board; and FIG. 11 is a similar view to FIG. 10 illustrating the pair of terminal clips after being inserted into the printed wiring board and soldered.

DETAILED DESCRIPTION OF THE PREFERRED EMBODIMENT

Referring now to the drawings, in FIGS. 1-11 there is illustrated a telephone line overvoltage protection device designated as a whole by the reference character 10 and constructed in accordance with principles of the present invention. Having reference to FIGS. 1 and 8, the telephone line overvoltage protection device 10 includes a terminal guard base generally designated 12 for receiving and positioning terminal clips 14, 16, 18 and 20 and a grounding member 22 within corresponding apertures 14A, 16A, 18A, 20A, and 22A and a housing 24 containing a printed wiring board 26.

Terminal guard base 12 provides electrical insulation between adjacent terminal clips 14, 16, 18 and 20 of each overvoltage protection device 10 and adjacent ones of the overvoltage protection devices 10. Multiple telephone line overvoltage protection devices 10 are used in conjunction with a conventional, compact telephone connector block (not shown) for connecting with subscriber telephone lines. Each overvoltage protection device 10 is operatively connected to the tip and ring lines of an individual telephone subscriber line (not shown) via the terminal clips 14, 16, 18 and 20.

Referring to FIGS. 1, 3, 4, 5 and 7, housing 24 is a unitary molded body having a pair of opposed sidewalls 28 and 30, a pair of opposed endwalls 32 and 34, a top wall 36 and an open bottom mating face 38 for slidingly receiving an upper wall portion 40 of the terminal guard base 12 until a recessed stop surface or ledge 42 is engaged. Each of two pairs of opposed wedges or fingers 44 of the upper wall portion 40 is received and retained in a corresponding aperture or opening 46 of the sidewalls 30 and 32 for a snap-fit, releasable mounting of the terminal guard base 12 with the housing 24.

Resilient, spring clip terminals such as best shown in FIGS. 7, 8 and 9 can be used for terminal clips 14, 16, 18 and 20, although various different terminal types can be employed. Terminal clips 14, 16, 18 and 20 include a lower spring clip portion 50 adapted for electrical and mechanical engagement with corresponding terminal blades of a telephone connector block (not shown). Each lower spring clip portion 50 is slidingly received within a terminal receiving channel 52 formed in a lower wall portion 54 of the terminal guard base 12. A shoulder terminal portion 56 engages a recessed stop surface 58 of the channel 52 and a locking terminal portion 60 engages a stop surface 62 for positioning and locking the terminal clip.

Referring now to FIGS. 2, 3, 8 and 9, an upper terminal portion 66 extends above the terminal guard base 12 in both the assembled condition of the overvoltage protection device 10 and an initial subassembly of the terminals with the terminal guard base 12. Bending of the terminal clips approximately at right angles is provided generally at a narrow terminal portion 68 after the terminal portions 66 are soldered to the printed wiring board 26.

Referring now to FIGS. 2, 3, 4, 5, 6 and 8, an upper portion 70 of the grounding member 22 extends above the terminal guard base 12 in both the assembled condition of the overvoltage protection device 10 and an initial subassembly of the terminals and grounding member with the terminal guard base 12. Bending of the grounding member 22 is provided generally at a narrow portion 72 after the grounding member 22 is soldered to the printed wiring board 26. A locking portion 74 engages a stop surface 76 for positioning and locking the grounding connecting member 22 with the terminal guard base 12. The grounding connecting member 22 of the overvoltage protection device 10 is connected with ground potential via a grounding screw 78 received through one of a pair of coined apertures 80 in the grounding member 22. Coining of the aperture 80 effectively provides a temporary lock of the grounding screw with the overvoltage protection device 10 so that the grounding screw 78 is not lost before the overvoltage protection device 10 is installed.

Printed wiring board 26 carries overvoltage protection circuitry generally designated 82 for connection with the individual telephone subscriber lines. Overvoltage protection circuitry 82 that advantageously can be used is disclosed by U.S. Pat. Nos. 4,758,920 and 4,941,063.

In accordance with features of the invention, assembly of the overvoltage protection device 10 eliminates the need for hand soldering and is inexpensive to manufacture due to the simple and efficient arrangement of the overvoltage protection device.

Assembly of the overvoltage protection device 10 is best understood with reference to FIGS. 9, 10, 11 and 7. Referring to FIG. 9, initially the terminal clips 14, 16, 18 and 20 are slidingly received within corresponding apertures 14A, 16A, 18A and 20A the terminal guard base 12. Referring to FIGS. 1 and 10, then the upper terminal portions 66 of terminal clips 14, 16, 18 and 20 and upper portion 70 of the grounding member 22 are formed in a straight line aligned for insertion within corresponding apertures 66A, 70A in the printed wiring board 26. FIG. 11 illustrates the terminal clips 14, 16, 18 and 20 after being wave soldered to the printed wiring board 26. The straight line alignment of the terminal clips 14, 16, 18 and 20 permits bending of the terminal clips generally at the narrow terminal portion 68 after being soldered to the printed wiring board. The assembled condition of the overvoltage protection device 10 is illustrated in FIGS. 1-7.

Preferably, both the housing 24 and terminal guard base 12 of the telephone line overvoltage protection device 10 are a unitary member formed of strong, flexible electrically insulating material. A plastic or similar, synthetic resin material forms both the housing 24 and terminal guard base 12 of the telephone line overvoltage protection device 10 by conventional injection molding techniques.

While the invention has been described with reference to details of the illustrated embodiment, these details are not intended to limit the scope of the invention as defined in the appended claims.

I claim:

1. A method of forming an overvoltage protection device comprising the steps of:
   providing a first terminal guard housing for defining a plurality of terminal receiving channels;
   providing a second housing for containing a printed wiring board; said first terminal guard housing arranged for mating engagement with said second housing;
   inserting a plurality of terminals in said terminal receiving channels; each of said terminals including an outwardly extending terminal portion extending outside said first terminal guard housing;
   aligning said outwardly extending terminal portions with a corresponding plurality of aligned terminal receiving apertures in said printed wiring board by bending adjacent outwardly extending terminal portions toward each other;
   inserting said aligned terminal portions in said aligned terminal receiving apertures and soldering said terminal portions to said printed wiring board; and
   bending said terminals to position said printed wiring board and a mating portion of said first terminal guard housing for insertion into said second housing.

2. A method as recited in claim 1 wherein each of said steps of providing said first terminal guard housing and said second housing includes forming both said first terminal guard housing and said second housing by injection molding.

3. A method as recited in claim 1 wherein said terminal receiving channels are provided at predetermined positions and said step of inserting a plurality of terminals in said terminal receiving channels includes the step of slidingly inserting said plurality of terminals in said terminal receiving channels until a stop surface in said terminal receiving channels is engaged.

4. A method as recited in claim 1 wherein said step of soldering said terminal portions to said printed wiring board comprises wave soldering.

5. A method as recited in claim 1 wherein said step of bending said terminals to position said printed wiring board and a mating portion of said first terminal guard housing for insertion into said second housing includes the step of bending said terminal approximately at right angles.

6. A method as recited in claim 1 wherein said step of bending said terminals to position said printed wiring board and a mating portion of said first terminal guard housing for insertion into said second housing includes the step of slidingly inserting said first terminal guard housing into said second housing until cooperating positioning and locking members of said first terminal guard housing and said second housing are cooperatively engaged.

* * * * *